US012522000B2

United States Patent
Nakamura et al.

(10) Patent No.: US 12,522,000 B2
(45) Date of Patent: Jan. 13, 2026

(54) INK JET RECORDING METHOD

(71) Applicant: SEIKO EPSON CORPORATION, Tokyo (JP)

(72) Inventors: Kiyoshi Nakamura, Matsumoto (JP); Masashi Yasui, Matsumoto (JP)

(73) Assignee: SEIKO EPSON CORPORATION (JP)

( * ) Notice: Subject to any disclaimer, the term of this patent is extended or adjusted under 35 U.S.C. 154(b) by 250 days.

(21) Appl. No.: 18/302,849

(22) Filed: Apr. 19, 2023

(65) Prior Publication Data

US 2023/0339239 A1 Oct. 26, 2023

(30) Foreign Application Priority Data

Apr. 20, 2022 (JP) ................. 2022-069348

(51) Int. Cl.
B41J 11/00 (2006.01)
B41J 2/21 (2006.01)

(52) U.S. Cl.
CPC .......... *B41J 11/00218* (2021.01); *B41J 2/21* (2013.01); *B41J 2/2114* (2013.01); *B41J 2/2117* (2013.01)

(58) Field of Classification Search
CPC ....... C09D 11/322; C09D 11/40; C09D 11/54; B41J 2/2117; B41J 2/2114; B41M 5/0017; B41M 7/00
See application file for complete search history.

(56) References Cited

U.S. PATENT DOCUMENTS

| 8,721,062 B2* | 5/2014 | Sano ........................ B41J 15/04 |
| | | 347/100 |
| 8,817,316 B2* | 8/2014 | Yoshida ................. G06K 15/02 |
| | | 358/1.18 |
| 2005/0046684 A1* | 3/2005 | Yoneyama ............. B41J 2/2114 |
| | | 347/102 |
| 2005/0179725 A1* | 8/2005 | Matsushima ............... B41J 2/51 |
| | | 347/40 |
| 2006/0158473 A1* | 7/2006 | Mills .................... B41J 11/0015 |
| | | 347/15 |
| 2011/0032299 A1* | 2/2011 | Mimura ................. B41J 2/2114 |
| | | 347/15 |

(Continued)

FOREIGN PATENT DOCUMENTS

CN 114106630 A 3/2022
JP 2018-111211 A 7/2018

*Primary Examiner* — John P Zimmermann
(74) *Attorney, Agent, or Firm* — Harness, Dickey & Pierce, P.L.C.

(57) ABSTRACT

An ink jet recording method includes an overcoat layer forming step of forming an overcoat layer on a color layer formed on a recording medium by using a radiation-curable white ink composition and a radiation-curable clear ink composition. The overcoat layer forming step includes an ejection step O of ejecting, from an ink jet head O, the radiation-curable white ink composition and the radiation-curable clear ink composition to be attached to the recording medium and an irradiation step O of applying radiation to the radiation-curable white ink composition and the radiation-curable clear ink composition which are attached to the recording medium to obtain the overcoat layer, and a coverage of the recording medium by the overcoat layer is less than 100%.

5 Claims, 2 Drawing Sheets

(56) References Cited

U.S. PATENT DOCUMENTS

| | | | |
|---|---|---|---|
| 2011/0234683 A1* | 9/2011 | Komatsu | B41J 2/2114 347/20 |
| 2011/0235069 A1* | 9/2011 | Otsuka | B41J 13/0045 358/1.8 |
| 2012/0127249 A1* | 5/2012 | Mizutaki | C09D 11/40 522/18 |
| 2013/0021401 A1* | 1/2013 | Okuda | B41J 2/2117 347/15 |
| 2015/0191031 A1* | 7/2015 | Ohta | B41J 11/0015 428/207 |
| 2017/0021641 A1* | 1/2017 | Goi | C09D 11/107 |
| 2017/0173988 A1* | 6/2017 | Ohta | C09D 11/36 |
| 2018/0194145 A1 | 7/2018 | Kasahara et al. | |
| 2020/0039232 A1* | 2/2020 | Asakawa | B41J 2/2117 |
| 2020/0231830 A1* | 7/2020 | Kobayashi | C08L 33/068 |
| 2020/0319391 A1* | 10/2020 | Vasylyev | G02B 6/001 |
| 2021/0024767 A1* | 1/2021 | Asakawa | B41J 11/00216 |
| 2022/0064467 A1 | 3/2022 | Tanaka et al. | |

* cited by examiner

INK JET RECORDING METHOD

The present application is based on, and claims priority from JP Application Serial Number 2022-069348, filed Apr. 20, 2022, the disclosure of which is hereby incorporated by reference herein in its entirety.

BACKGROUND

1. Technical Field

The present disclosure relates to an ink jet recording method.

2. Related Art

Ink jet recording methods have been rapidly developed in various fields since a high resolution image can be recorded by using a relatively simple apparatus. Regarding such a method, to provide added value to recorded materials, recorded materials having a matte finish and recorded materials having a matte finish and a gloss finish in combination have been developed, and an improvement in the quality thereof have been attempted.

For example, JP-A-2018-111211 discloses a printing apparatus including a head for ejecting a photo-curable ink, a light application apparatus for applying light, and a predetermined control portion for controlling an amount of the photo-curable ink ejected and a standby time from a timing of the photo-curable ink hitting a printing medium to application of the light, for the purpose of performing printing in which a high-resolution image having surface smoothness is formed without distorted ink dot edges. The control portion of the recording apparatus described in JP-A-2018-111211 forms a glossy or matte recorded material by controlling the amount of ejection and the standby time.

JP-A-2018-111211 describes applying ultraviolet rays immediately after the ink hits the printing medium to enable the ink to be cured before an ink dot is planarized and thereby a matte finish with less gloss to be prepared. However, it was found that only curing the ink before the ink dot is planarized to form unevenness on the surface of the recorded material does not result in the recorded material having a matte finish depending on a viewing angle of the recorded material.

SUMMARY

According to an aspect of the present disclosure, an ink jet recording method includes an overcoat layer forming step of forming an overcoat layer on a color layer formed on a recording medium by using a radiation-curable white ink composition and a radiation-curable clear ink composition. The overcoat layer forming step includes an ejection step O of ejecting, from an ink jet head O, the radiation-curable white ink composition and the radiation-curable clear ink composition to be attached to the recording medium and an irradiation step O of applying radiation to the radiation-curable white ink composition and the radiation-curable clear ink composition which are attached to the recording medium to obtain the overcoat layer, and a coverage of the recording medium by the overcoat layer is less than 100%.

DESCRIPTION OF EXEMPLARY EMBODIMENTS

Figure 1:
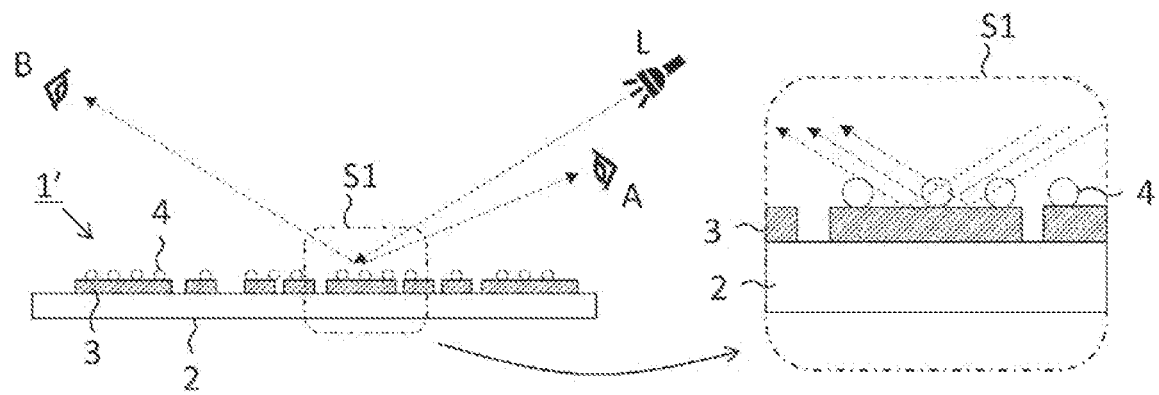
FIG. 1 is a schematic diagram illustrating an appearance of a recorded material provided with unevenness on the surface by a method in the related art.

The embodiment according to the present disclosure (hereafter referred to as "the present embodiment") will be described below in detail with reference to the drawings, as the situation demands. However, the present disclosure is not limited to this and can be variously modified within the scope of the disclosure. In this regard, in the drawings, the same elements are denoted by the same reference characters and duplicate explanations may be omitted. The positional relationship in the up-down direction, the right-left direction, or the like is based on the positional relationship illustrated in the drawings, unless otherwise specified. Further, the actual dimensional ratios are not limited to the ratios illustrated in the drawings.

1. Ink Jet Recording Method

An ink jet recording method according to the present embodiment (hereafter also simply referred to as "the present recording method") includes an overcoat layer forming step of forming an overcoat layer on a color layer formed on a recording medium by using a radiation-curable white ink composition (hereafter also referred to as simply "white ink composition") and a radiation-curable clear ink composition (hereafter also simply referred to as "clear ink composition"). The overcoat layer forming step includes an ejection step O of ejecting, from an ink jet head O, the radiation-curable white ink composition and the radiation-curable clear ink composition to be attached to the recording medium and an irradiation step O of applying radiation to the radiation-curable white ink composition and the radiation-curable clear ink composition which are attached to the recording medium to obtain the overcoat layer. A coverage of the recording medium by the overcoat layer is less than 100%.

In the related art, a method in which particles of a clear ink composition are arranged on the surface of an image is used for a matte finish by using the radiation-curable ink composition. However, when the clear ink composition alone is used for a matte finish, there is a problem that a matte finish nonuniformly appears depending on the positional relationship between an observer and a light source during observation of a recorded material. In particular, when the light source is arranged behind the observer, since most of the light is not reflected irregularly and advances toward the opposite side, a gloss finish appears so that it is difficult to express a uniform matte finish.

To explain this point, FIG. 1 is a schematic diagram illustrating an appearance of a recorded material provided with unevenness on the surface by a method in the related art. FIG. 1 illustrates a section of the recorded material provided with unevenness on the surface, and Si illustrates a partly enlarged view of the section. The recorded material 1' obtained by a method in the related art illustrated in FIG. 1 includes a color layer 3 on a recording medium 2 and includes unevenness 4 (an overcoat layer) formed by using the clear ink on the color layer 3. Regarding such a recorded material 1', during observation of the recorded material 1', when viewed from an eye point A on the light source L side, appearance of a matte finish is not obtained in some cases since an incident angle of light from the light source L is large and an amount of light irregularly reflected by the surface of the unevenness 4 of the overcoat layer is reduced.

On the other hand, when viewed from an eye point B opposite to the light source L, a matte finish tends to appear since irregularly reflected light is readily observed. As described above, when the unevenness (overcoat layer) is formed of a clear ink or the like by using a method in the related art, there is a large difference between the reflected light when a recorded material is viewed from the light source side and the reflected light when the recorded material is viewed from a position opposite to the light source depending on the recorded material. Therefore, a phenomenon that an appearance of a matte finish is not easily obtained occurs depending on a viewing angle of the recorded material.

On the other hand, in the recording method according to the present embodiment, the white ink composition and the clear ink composition are ejected onto the color layer to form the overcoat layer on the color layer on the recording medium.

Figure 2:
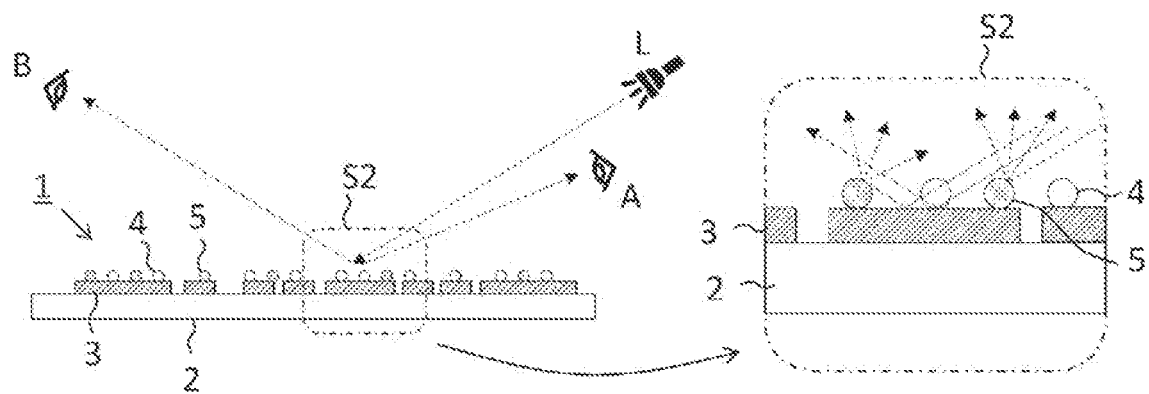
FIG. 2 is a schematic diagram illustrating an appearance of a recorded material provided with an overcoat layer on the surface according to the present embodiment.

Consequently, as illustrated in FIG. 2, a recorded material 1 obtained according to the present embodiment includes a color layer 3 on a recording medium 2 and, on the color layer 3, unevenness 4 formed of the clear ink composition and unevenness 5 formed of the white ink composition which serve as an overcoat layer. Regarding such recorded material 1, when viewed from an eye point A on the light source L side, a matte finish tends to appear since irregular reflection of light by the surface of the unevenness 5 formed of the white ink composition is markedly visible. On the other hand, even when viewed from an eye point B opposite to the light source L, a matte finish tends to appear since irregular reflection of light by both the surface of the unevenness 5 formed of the white ink and the surface of the unevenness 4 formed of the clear ink can be observed. Consequently, a recorded material that appears to have a matte finish when viewed at any angle regardless of the position of the light source relative to the recorded material can be obtained.

Steps included in the recording method according to the present embodiment, ink compositions used in the steps, and a recording apparatus will be described below.

1.1. Overcoat Layer Forming Step

The overcoat layer forming step of the present recording method includes an ejection step O of ejecting, from an ink jet head O, the white ink composition and the clear ink composition to be attached to the recording medium and an irradiation step O of applying radiation to the white ink composition and the clear ink composition which are attached to the recording medium to obtain the overcoat layer. In the overcoat layer forming step, when the white ink composition and the clear ink composition are used, the obtained recorded material has a uniform matte finish.

The overcoat layer is referred to as "layer" for the sake of convenience but is not limited to being a coated film. As illustrated in FIG. 2, the overcoat layer may be protruded portions of the white ink composition and the clear ink composition.

A coverage of the recording medium by the overcoat layer is less than 100%. When the coverage by the overcoat layer is set to be within the above-described range, the recorded material has a uniform matte finish and the image quality is excellent. In this regard, in the present specification, the coverage of the recording medium is a proportion of an area of the surface of the printing medium covered with a cured material of the ink composition. There is no particular limitation regarding a method for determining the coverage, provided that the method can calculate the proportion of the area. For example, observation may be performed in the direction perpendicular to the surface of the recorded material by using an optical microscope, and the proportion with respect to the resulting image may be calculated by using analysis software or the like. There is no particular limitation regarding the method for controlling the coverage. For example, the coverage can be controlled by an amount of ink per droplet, Duty, or the like.

Regarding the overcoat layer, preferably, the coverage of the recording medium by the white ink composition may be 50 area % or less, may be 40 area % or less, may be 30 area % or less, may be 20 area % or less, may be 15 area % or less, or may be 10 area % or less. In addition, regarding the overcoat layer, preferably, the coverage of the recording medium by the white ink composition may be 1 area % or more, may be 3 area % or more, may be 5 area % or more, may be 10 area % or more, or may be 15 area % or more. A change in a color tone of the resulting recorded material tends to be further suppressed with decreasing coverage by the white ink composition. In addition, the tendency for the resulting recorded material to appear matte tends to be further improved with increasing coverage by the white ink composition.

Regarding the overcoat layer, preferably, the coverage of the recording medium by the clear ink composition may be 5 area % or more, may be 10 area % or more, or may be 20 area % or more. Regarding the overcoat layer, preferably, the coverage of the recording medium by the clear ink composition may be 99 area % or less, may be 97 area % or less, may be 95 area % or less, may be 90 area % or less, may be 85 area % or less, may be 70 area % or less, may be 60 area % or less, or may be 50 area % or less. An influence on the texture of the resulting recorded material tends to be further suppressed with decreasing coverage by the clear ink composition. In addition, the tendency for the resulting recorded material to appear matte tends to be further improved with increasing coverage by the clear ink composition.

Preferably, the coverage by the overcoat layer may be less than 100 area %, may be 90 area % or less, may be 80 area % or less, may be 70 area % or less, may be 60 area % or less, or may be 50 area % or less. In addition, preferably, the coverage by the overcoat layer may be 10 area % or more, may be 20 area % or more, may be 30 area % or more, or may be 40 area % or more. The resulting recorded material becoming whitish tends to be further suppressed with a decrease in coverage by the overcoat layer. In addition, the tendency for the resulting recorded material to appear matte tends to be further improved with increasing coverage by the overcoat layer.

Regarding the overcoat layer, the cured material of the white ink composition and the cured material of the clear ink composition may be arranged side by side in parallel on the surface of the recording medium or may be attached to the recording medium while being stacked one on top of another. Regarding the order of the overcoat layer forming step by using the two ink compositions, the white ink composition may be applied first, or the clear ink composition may be applied first.

Further, Duty is a parameter for expressing the covering state of the recording medium. In the present specification, "Duty" corresponds to a value obtained from Formula (1) below.

Duty (%)=number of dots actually printed/(vertical resolution×horizontal resolution)×100   (1)

(In the formula, "the number of dots actually printed" is the number of dots actually printed per unit area, and each of "vertical resolution" and "horizontal resolution" is resolution per unit area.)

In the present recording method, Duty of the overcoat layer is preferably less than 100%. When Duty of the overcoat layer is within the above-described range, a matte finish of the resulting recorded material tends to be further improved. From the same viewpoint, Duty of the overcoat layer of the recorded material is preferably 95% or less, more preferably 90% or less, further preferably 85% or less, and still further preferably 80% or less. In addition, Duty of the overcoat layer may be 20% or more, may be 30% or more, and may be 50% or more.

Duty of the white ink composition of the recorded material is preferably 1% or more and 40% or less, more preferably 3% or more and 30% or less, and further preferably 5% or more and 20% or less from the viewpoint of increasing the tendency for the recorded material to appear matte and suppressing whitening of an image formed of the color layer.

In addition, Duty of the clear ink composition of the recorded material is preferably 5% or more and 90% or less, more preferably 10% or more and 80% or less %, and further preferably 20% or more and 60% or less from the viewpoint of increasing the tendency for the recorded material to appear matte and suppressing the recorded material becoming a gloss finish.

1.1.1. Ejection Step O

The ejection step O is a step of ejecting each of the white ink composition and the clear ink composition onto the color layer formed on the recording medium and attaching the white ink composition and the clear ink composition to the color layer and/or the recording medium. More specifically, a pressure generation device is operated so as to eject, from the nozzle, the white ink composition or the clear ink composition filling a pressure generation chamber of the ink jet head O. Such an ejection method is also referred to as an ink jet method.

Regarding the ink jet head O used in the ejection step O, there are a line head for performing recording based on a line system and a serial head for performing recording based on a serial system. Of these, it is preferable that the line head O is a line ink jet head.

In the line system including a line head, for example, an ink jet head having a width larger than or equal to a width of a recording width of a recording medium is fixed to an ink jet apparatus. Subsequently, the recording medium is moved in a sub-scanning direction (longitudinal direction of the recording medium; transport direction) and an ink droplet is ejected from a nozzle of the ink jet head in conjunction with the movement so that an image is recorded on the recording medium.

In the serial system including a serial head, for example, an ink jet head is mounted on a carriage movable in a width direction of the recording medium. Subsequently, the carriage is moved in a main scanning direction (lateral direction of the recording medium; width direction) and an ink droplet is ejected from a nozzle opening of the ink jet head in conjunction with the movement so that an image can be recorded on the recording medium.

1.1.2. Irradiation Step O

In the irradiation step, radiation is applied to the white ink composition and the clear ink composition attached to the recording medium. When the radiation is applied, a polymerization reaction of a monomer is initiated, and the ink composition is cured so as to form a coating film. In such an instance, when a photopolymerization initiator is present, an active species (initiation species) such as a radical, an acid, or a base is generated, and the polymerization reaction of the monomer is facilitated due to the function of the initiation species. In this regard, when a photosensitizer is present, the photosensitizer absorbs radiation to be in an excited state and facilitates decomposition of a photopolymerization initiator due to contact with the photopolymerization initiator, and a curing reaction can be further achieved.

Examples of the radiation used in the irradiation step include ultraviolet rays, infrared rays, visible rays, and X-rays. The radiation is applied to the ink composition from a radiation source disposed downstream of the ink jet head. There is no particular limitation regarding the radiation source, and the radiation source is, for example, an ultraviolet-emitting diode. Using the ultraviolet-emitting diode enables a size reduction of the apparatus and a cost reduction to be realized. The ultraviolet-emitting diode serving as an ultraviolet source is small and this is particularly advantageous when the ultraviolet-emitting diode is incorporated into an ink jet apparatus.

1.2. Color Layer Forming Step

The present recording method includes a color layer forming step of forming the color layer by using a radiation-curable color ink composition (hereafter also referred to as simply "color ink composition"). The color layer forming step includes an ejection step C for ejecting, from an ink jet head C, the radiation-curable color ink composition to be attached to the recording medium and an irradiation step C of applying radiation to the radiation-curable color ink composition attached to the recording medium to obtain the color layer, and the above-described overcoat layer forming step is performed after the color layer forming step. Forming the overcoat layer on the color layer enables an image formed by the color layer to have a matte finish.

1.2.1. Ejection Step C

The ejection step C is a step of ejecting and attaching each of various color ink compositions onto the recording medium. More specifically, an ink jet method is used in which a pressure generation device is operated so as to eject, from the nozzle, the white ink composition or the clear ink composition filling a pressure generation chamber of the ink jet head C.

Regarding the ink jet head C used in the ejection step C, there are a line head for performing recording based on a line system and a serial head for performing recording based on a serial system. In general, when the ink jet head O is a line head, the ink jet head C is also a line head, and when the ink jet head O is a serial head, the ink jet head C is also a serial head.

1.2.2. Irradiation Step C

In the irradiation step C, radiation is applied to the color ink composition attached to the recording medium. When the radiation is applied, the color ink composition is cured so as to form a coating film. In such an instance, it is preferable that a color ink composition containing a photosensitizer which facilitates a curing reaction of the ink composition be used similarly to that in the irradiation step O.

Regarding the radiation used for the irradiation step C, radiation and the radiation source similar to those for the irradiation step O can be used. There is no particular limitation regarding the radiation source. For example, the ultraviolet-emitting diode advantages in size reduction may be used.

1.3. Radiation-Curable Ink Composition

The radiation-curable ink composition (hereafter also referred to as "ink composition") used in the present embodiment contains a polymerizable compound as an indispensable component and may further contain a photopolymerization initiator, a coloring material, a dispersing agent, a surfactant, a polymerization inhibitor, and the like, as the situation demands. For example, the radiation-curable color ink composition for forming the color layer may contain a coloring material and a polymerizable compound, the radiation-curable clear ink composition used for forming the overcoat layer may contain at least a polymerizable compound without containing a coloring material, and the radiation-curable white ink composition may contain at least a white pigment and a polymerizable compound.

1.3.1. Polymerizable Compound

Regarding the polymerizable compound, compounds that are cured by being irradiated with radiation are generically referred to as polymerizable compounds. Polymerizable compounds include monofunctional monomers having a polymerizable functional group and polyfunctional monomers having a plurality of polymerizable functional groups and, as the situation demands, may include oligomers having one or more polymerizable functional groups. In this regard, only one type of the polymerizable compounds may be used, or two or more types thereof may be used in combination.

Examples of the monofunctional monomer include aromatic monofunctional monomers, nitrogen-containing monofunctional monomers, and aliphatic-group-containing monofunctional monomers. Examples of the polyfunctional monomer include vinyl-ether-group-containing (meth)acrylates and polyfunctional (meth)acrylates.

The content of the polymerizable compound may be 10% by mass or more and 99% by mass or less, may be 20% by mass or more and 95% by mass or less, may be 30% by mass or more and 90% by mass or less, or may be 40% by mass or more and 80% by mass or less relative to the total amount of the ink composition.

1.3.2. Photopolymerization Initiator

There is no particular limitation regarding the photopolymerization initiator provided that an active species is generated by application of radiation, and examples include known photopolymerization initiators, such as acylphosphine-oxide-based photopolymerization initiators, alkylphenone-based polymerization initiators, titanocene-based polymerization initiators, and thioxanthone-based photopolymerization initiators. Only one type of the photopolymerization initiators may be used, or two or more types thereof may be used in combination.

The content of the photopolymerization initiator is preferably 1.0% by mass or more and 10.0% by mass or less, more preferably 1.0% by mass or more and 8.0% by mass or less, and further preferably 2.0% by mass or more and 7.0% by mass or less relative to the total amount of the ink composition.

1.3.3. Coloring Material

The ink composition of the present recording method may contain a coloring material, as the situation demands. Regarding the coloring material, at least one of a pigment and a dye can be used. In this regard, only one type of the coloring materials may be used, or two or more types thereof may be used in combination.

There is no particular limitation regarding the pigment, and examples include inorganic pigments and organic pigments. Examples of the inorganic pigments include carbon black (C.I. Pigment Black 7) and the like, such as furnace black, lamp black, acetylene black, and channel black, iron oxide, and titanium oxide.

Examples of the organic pigment include azo pigments, such as insoluble azo pigments, condensed azo pigments, azo lakes, and chelate azo pigments, polycyclic pigments, such as phthalocyanine pigments, perylene and perinone pigments, anthraquinone pigments, quinacridone pigments, dioxane pigments, thioindigo pigments, isoindolinone pigments, and quinophthalone pigments, dye chelates (for example, basic-dye-type chelates, acidic-dye-type chelates, and the like), color lakes (basic-dye-type lakes and acidic-dye-type lakes), nitro pigments, nitroso pigments, aniline black, and daylight fluorescent pigments.

Dyes may be used as the coloring material. There is no particular limitation regarding the dye, and, for example, acidic dyes, direct dyes, reactive dyes, and basic dyes may be used.

There is no particular limitation regarding the content of the coloring material, and the content may be appropriately adjusted in accordance with the features of the ink composition to be prepared. The content of the coloring material may be 0% by mass or more and 30% by mass or less or may be 1% by mass or more and 25% by mass or less relative to the total amount of the ink composition.

1.3.4. Fluorescent Brightener

The fluorescent brightener is a substance capable of absorbing light in a specific wavelength region and emitting light in a different wavelength region. Regarding the wavelength region, for example, the fluorescent brightener absorbs light in a wavelength region of about 300 to 400 nm and emits light in a wavelength region of about 400 to 500 nm. Examples of such a fluorescent brightener include naphthalene benzoxazolyl derivatives, thiophene benzoxazolyl derivatives, stilbene benzoxazolyl derivatives, coumarin derivatives, styrene biphenyl derivatives, pyrazolone derivatives, stilbene derivatives, benzene and biphenyl styryl derivatives, bis(benzazol-2-yl) derivatives, carbostyril, naphthalimide, dibenzothiophene-5,5'-dioxide derivatives, pyrene derivatives, and pyridotriazole. In this regard, only one type of the fluorescent brighteners may be used, or two or more types thereof may be used in combination.

In the present recording method, it is preferable that the clear ink composition contained in the overcoat layer contain a fluorescent brightener. When the clear ink composition contains the fluorescent brightener, the clear ink composition emits white light, and the tendency for the resulting recorded material to appear matte tends to be further improved.

In this regard, the content of the fluorescent brightener contained in the clear ink composition may be 0.1% by mass or more and 1.0% by mass or less or may be 0.1% by mass or more and 0.5% by mass or less relative to the total amount of the clear ink composition.

1.3.5. Surfactant

Examples of the surfactant include acetylene-glycol-based surfactants, fluorine-based surfactants, and silicone-based surfactants. Only one type of the surfactants may be used, or two or more types thereof may be used in combination.

Examples of the acetylene-glycol-based surfactant include 2,4,7,9-tetramethyl-5-decyne-4,7-diol or alkylene oxide adducts thereof and 2,4-dimethyl-5-decyn-4-ol or alkylene oxide adducts thereof. Commercially available products may be used as the acetylene-glycol-based surfactant. Examples of the commercially available product include OLFIN (registered trademark) 104 Series (trade name) and E Series (trade name) produced by Nisshin Chemical Industry Co., Ltd., and Surfynol (registered trademark) Series (trade name) produced by Air Products and Chemicals, Inc.

Examples of the fluorine-based surfactant include perfluoroalkyl sulfonic acid salts, perfluoroalkyl carboxylic acid salts, perfluoroalkyl phosphoric acid esters, perfluoroalkyl ethylene oxide adducts, perfluoroalkyl betaine, and perfluoroalkyl amine oxide compounds.

Commercially available products may be used as the fluorine-based surfactant. Examples of the commercially available products include S-144 (trade name) and S-145 (trade name) produced by ASAHI GLASS CO., LTD.

Examples of the silicone-based surfactant include polysiloxane-based compounds and polyether-modified organosiloxanes.

Commercially available products may be used as the silicone-based surfactant. Examples of the commercially available products include 306, 307, 333, 341, 345, 346, 347, 348, and 349 (all are trade names) of BYK (registered trademark) Series produced by BYK Japan KK.

The content of the surfactant is preferably 0.05% by mass or more and 2.5% by mass or less, more preferably 0.1% by mass or more and 1.5% by mass or less, and further preferably 0.3% by mass or more and 1.0% by mass or less relative to the total amount of the ink composition.

1.4 Recording Medium

There is no particular limitation regarding the recording medium used in the ink jet recording method according to the present embodiment, and examples include absorbent recording media, low-absorbent recording media, and nonabsorbent recording media. From the viewpoint of more reliably exerting the effect of the present disclosure, regarding the material for forming the recording medium, the front surface and the back surface are preferably nonabsorbent or low absorbent and more preferably nonabsorbent.

Examples of the nonabsorbent recording medium include polymer films or plates formed of polyvinylchlorides, polyethylene terephthalates, polycarbonates, polystyrenes, polyurethanes, polyethylenes, polypropylenes, polyvinyl acetals, blend compositions of at least two of these, and the like, films or plates of cellulose diacetates, cellulose triacetates, cellulose propionates, cellulose butylates, cellulose acetate butylates, cellulose nitrates, and the like, metal foil or plates formed of iron, silver, copper, aluminum, and the like, plates or films produced by vapor-depositing these metals, foil or plates of alloys such as stainless steel and brass, and glass plates.

Regarding the low-absorbent recording medium, there are recording media provided with a coating layer (receiving layer) for receiving a liquid on the surface. Examples include recording media in which the surface of the above-described film or plate is coated with a hydrophilic polymer or the like and recording media to which particles of silica, titanium, or the like and a binder (a hydrophilic polymer such as a polyvinyl alcohol or a polyvinyl pyrrolidone) are applied. In addition, examples of the recording medium which has low absorbency with respect to a liquid and in which the base material is paper include actual printing stock, such as art paper, coated paper, and matte paper.

The nonabsorbent or low-nonabsorbent recording medium is a recording medium having properties of absorbing no ink (liquid) or absorbing substantially no ink (liquid). Quantitatively, the nonabsorbent or low-absorbent recording medium is a "recording medium that exhibits an amount of water absorbed in 30 msec$^{1/2}$ from the start of contact being 10 mL/m$^2$ or less in accordance with the Bristow method". The Bristow method is the most widely used method for measuring an amount of a liquid absorbed in a short time and is also adopted by the Japan Technical Association of the Pulp and Paper Industry (JAPAN TAPPI). The test method is described in detail in Standard No. 51 "Paper and Paperboard-Liquid Absorbency Test Method-Bristow Method" of "JAPAN TAPPI Paper and Pulp Test Methods 2000 edition". On the other hand, the absorbent recording medium is a recording medium not exhibiting nonabsorbency or low absorbency.

The recording medium may be colorless and transparent, semitransparent, colored and transparent, chromatic and opaque, nonchromatic and opaque, or the like. In this regard, the recording medium itself may be colored, semitransparent, or transparent.

2. Ink Jet Recording Apparatus

The ink jet recording apparatus (hereafter also simply referred to as "recording apparatus") usable for the present recording method includes a first line ink jet head unit for ejecting and attaching a color ink composition to a recording medium, a first irradiation portion for applying radiation to the color ink composition attached to the recording medium to form a color layer, a second line ink jet head unit ejecting and attaching a radiation-curable white ink composition and a clear ink composition onto the color layer on the recording medium, and a second irradiation portion for applying radiation to the white ink composition and the clear ink composition attached to the color layer to form an overcoat layer.

Regarding the system of the ink jet recording method, the line system may be used, or the serial system may be used. Of these, the line system is preferable. The line system is a recording system in which an ink jet head that is fixed to the ink jet recording apparatus and that has a width larger than or equal to a recording width of the recording medium is used, the recording medium is moved in a longitudinal direction (transport direction) of the recording medium, and an ink droplet is ejected from a nozzle of the ink jet head in conjunction with the movement to form an image on the recording medium. The serial system is a system in which recording is performed by performing main scanning a plurality of times. In this regard, an ink jet head used for the serial system is referred to as a serial ink jet head or a serial head, and an ink jet head used for the line system is referred to as a line ink jet head or a line head.

Figure 3:
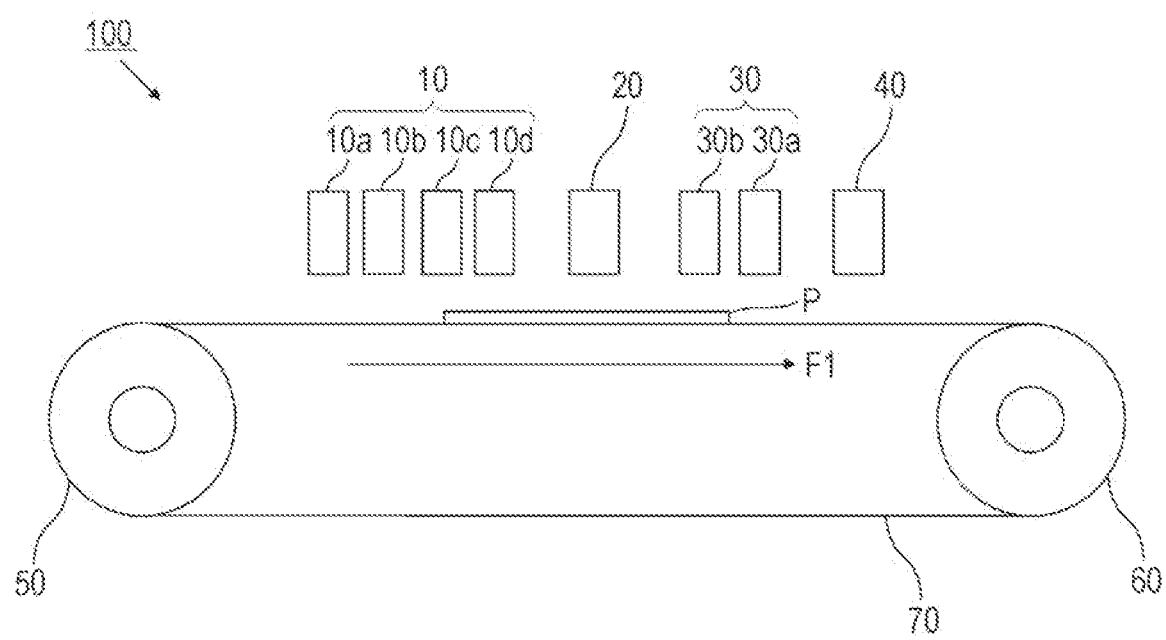
FIG. 3 is a schematic sectional view illustrating an example of a recording apparatus according to the present embodiment.
Figure 4:
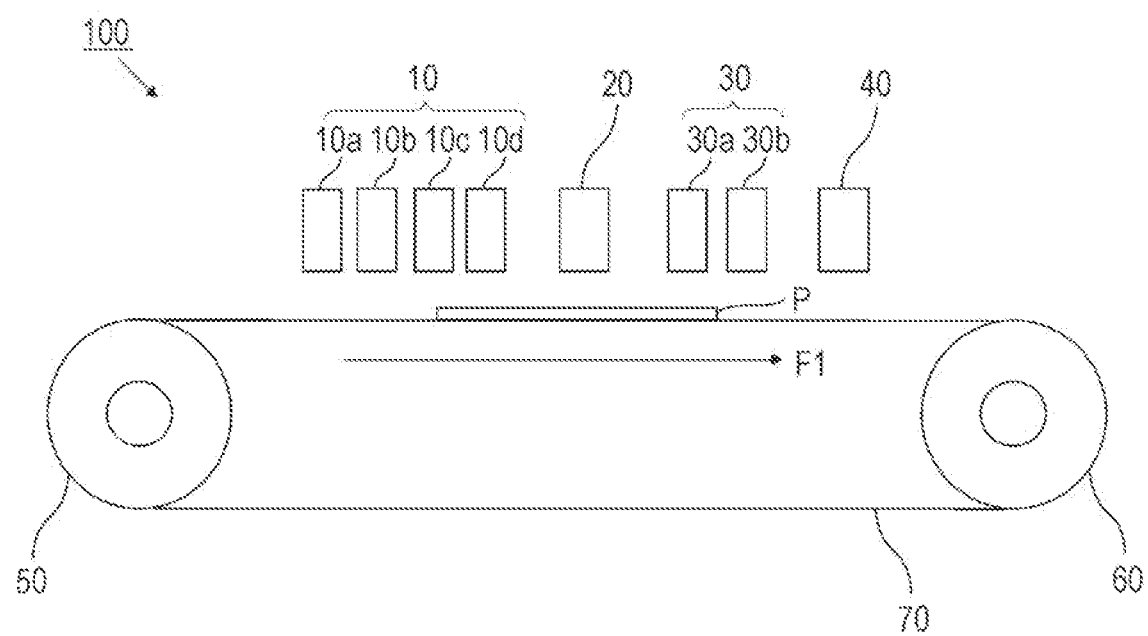
FIG. 4 is a schematic sectional view illustrating another example of a recording apparatus according to the present embodiment.

FIG. 3 and FIG. 4 are schematic sectional views illustrating examples of the ink jet recording apparatus according to the present embodiment. In FIG. 3, the recording apparatus 100 includes a first line ink jet head unit 10, a first irradiation portion 20, a second line ink jet head unit 30, and a second irradiation portion 40. The first line ink jet head unit 10, the first irradiation portion 20, the second line ink jet head unit 30, and the second irradiation portion 40 may be disposed in this order in the transport direction F1 of the recording medium P.

In addition, the recording apparatus 100 may include an upstream transport roller 50, a downstream transport roller 60, and a belt 70 serving as a configuration for transporting the recording medium P from the upstream position D1 in the transport direction to the downstream position D2 in the transport direction.

2.1. First Line Ink Jet Head Unit

The first line ink jet head unit 10 ejects and attaches a color ink composition to the recording medium P. Consequently, the color layer can be formed on the recording medium P. In the present embodiment, "unit" denotes a combination of a plurality of line ink jet heads configured to achieve a predetermined purpose. For example, as illustrated in FIG. 3, the first line ink jet head unit 10 of the recording apparatus 100 according to the present embodiment may include line ink jet heads 10a to 10d independently provided for respective colors such as cyan, magenta, yellow, orange, black, and white. Using such a first line ink jet head unit 10 enables the color layer to be formed.

2.2. First Irradiation Portion

The first irradiation portion 20 applies radiation to the color ink composition attached to the recording medium P to form the color layer. A polymerizable compound in the color ink composition is polymerized by the first irradiation portion 20 so that the color layer is formed.

In FIG. 3 and FIG. 4, the first irradiation portion 20 is disposed upstream of the second line ink jet head unit 30 in the direction F. When there are a plurality of first line ink jet head units 10, the first irradiation portion 20 may be disposed downstream of the first line ink jet head units 10 in the direction F. Consequently, since radiation can be applied in a single operation to the color ink composition attached onto the recording medium P by using a plurality of first line ink jet head units 10, the size of the recording apparatus can be reduced.

Alternatively, when there are a plurality of first line ink jet head units 10, the first irradiation portion 20 may be disposed between the plurality of first line ink jet head units 10, for example, between the first line ink jet heads 10a to 10d. The first irradiation portion 20 being disposed between the respective heads enables radiation to be applied to the respective color ink compositions immediately after the ink compositions are attached to the recording medium P, and the image quality of the recorded material tends to be improved.

2.3. Second Line Ink Jet Head Unit

The second line ink jet head unit 30 ejects and attaches the white ink composition and the clear ink composition onto the color layer formed on the recording medium P. The overcoat layer is formed on the color layer by using the second line ink jet head unit 30. Forming the overcoat layer by using the radiation-curable white ink composition and clear ink composition enables the resulting recorded material to have a uniform matte finish.

The second line ink jet head unit 30 ejects and attaches the white ink composition and the clear ink composition onto the color layer and/or the recording medium P. The overcoat layer is formed by using the second line ink jet head unit 30. Regarding formation of the overcoat layer, the recording apparatus 100 may include the second line ink jet head units 30 independently provided for the white ink composition and the clear ink composition.

In FIG. 3, the second line ink jet head unit 30 may include a second A-line ink jet head 30a for ejecting the white ink composition and a second B-line ink jet head 30b for ejecting the clear ink composition. The second A-line ink jet head 30a is disposed at the downstream position D2 of the second B-line ink jet head 30b in the transport direction of the recording medium P. The second A-line ink jet head 30a and the second B-line ink jet head 30b are ink jet heads for ejecting the white ink composition and the clear ink composition, respectively.

In FIG. 4, the second line ink jet head unit 30 includes a second A-line ink jet head 30a and a second B-line ink jet head 30b. In FIG. 4, the second B-line ink jet head 30b is disposed at the downstream position D2 of the second A-line ink jet head 30a in the transport direction of the recording medium P. A recorded material having a uniform matte finish can be obtained even when observed at various angles regardless of the disposition order of the second A-line ink jet head 30a and the second B-line ink jet head 30b.

2.4. Second Irradiation Portion

The second irradiation portion 40 applies radiation to the white ink composition and the clear ink composition attached to the color layer formed on the recording medium P to form the overcoat layer. A polymerizable compound in the color ink composition is polymerized by the second irradiation portion 40 so that the overcoat layer is formed.

In FIG. 3 and FIG. 4, the second irradiation portion 40 is disposed downstream of the second line ink jet head unit 30 in the direction F. The second line ink jet head unit 30 includes at least one second A-line ink jet head 30a and at least one second B-line ink jet head 30b. Therefore, it is sufficient that the second irradiation portion 40 is disposed at a position downstream of both the ink jet heads. Consequently, since radiation can be simultaneously applied to the radiation-curable white ink composition and the clear ink composition attached to the color layer and/or the recording medium P, the size of the recording apparatus can be further reduced. In other words, from the viewpoint of improving the efficiency of the ink jet recording by reducing the overall size of the recording apparatus 100, the second irradiation portion 40 may be disposed at a position other than the position between the second A-line ink jet head 30a and the second B-line ink jet head 30b, as in FIG. 3 and FIG. 4.

Alternatively, the second irradiation portion 40 may be independently disposed between the respective line ink jet heads. The second irradiation portion 40 being disposed between the respective heads enables radiation to be applied immediately after one of the white ink composition and the color ink composition is attached to the recording medium P, and the recorded material tends to have a more uniform matte finish.

2.5. Others

Although not illustrated in the drawing, the upstream transport roller 50 and the downstream transport roller 60 are rotated in accordance with rotation of a transport motor and thereby drive the belt 70 so as to transport the recording medium P in the direction F1.

What is claimed is:

1. An ink jet recording method comprising:
   an overcoat layer forming step of forming an overcoat layer on a color layer formed on a recording medium by using a radiation-curable white ink composition and a radiation-curable clear ink composition, wherein
   the overcoat layer forming step includes
      an ejection step O of ejecting, from an ink jet head O, the radiation-curable white ink composition and the radiation-curable clear ink composition to be attached to the recording medium and
      an irradiation step O of applying radiation to the radiation-curable white ink composition and the radiation-curable clear ink composition which are attached to the recording medium to obtain the overcoat layer, and
   a coverage of the recording medium by the overcoat layer is less than 100% such that the overcoat layer is unevenly dispersed on the color layer and imparts a uniform matte finish to a recorded material including the overcoat layer, and
   droplets of the white ink composition are positioned be droplets of the radiation-curable clear ink composition on a same surface of the color layer.

2. The ink jet recording method according to claim 1 further comprising:
    a color layer forming step of forming the color layer by using a radiation-curable color ink composition, wherein
    the color layer forming step includes
        an ejection step C of ejecting, from an ink jet head C, the radiation-curable color ink composition to be attached to the recording medium and
        an irradiation step C of applying radiation to the radiation-curable color ink composition attached to the recording medium to obtain the color layer, and
    the overcoat layer forming step is performed after the color layer forming step.

3. The ink jet recording method according to claim 1, wherein
    in the overcoat layer, a coverage of the recording medium by the radiation-curable white ink composition is 20% or less.

4. The ink jet recording method according to claim 1, wherein
    the ink jet head O is a line ink jet head.

5. The ink jet recording method according to claim 1, wherein
    the radiation-curable clear ink composition contains a fluorescent brightener.

\* \* \* \* \*